United States Patent [19]

Yaeger

[11] Patent Number: 5,463,514
[45] Date of Patent: Oct. 31, 1995

[54] DISC DRIVE SLIDER LIFTER USING SHAPE MEMORY METALS

[75] Inventor: John R. Yaeger, Santa Clara County, Calif.

[73] Assignee: Seagate Technology, Inc., Scotts Valley, Calif.

[21] Appl. No.: 504,964

[22] Filed: Apr. 5, 1990

[51] Int. Cl.$^6$ ............................... G11B 5/54; G11B 21/22
[52] U.S. Cl. ............................................. 360/105; 337/140
[58] Field of Search ................................... 360/104–105, 360/109; 337/140

[56] References Cited

U.S. PATENT DOCUMENTS

| | | | |
|---|---|---|---|
| 4,551,974 | 11/1985 | Yaeger et al. | 337/140 |
| 4,605,979 | 8/1986 | Inoue et al. | 360/105 |
| 4,670,804 | 6/1987 | Kant et al. | 360/105 X |
| 4,684,913 | 8/1987 | Yaeger | 337/140 |
| 4,691,258 | 9/1987 | Kobayashi et al. | 360/105 X |
| 4,772,807 | 9/1988 | Bouvot | 307/119 |

*Primary Examiner*—John H. Wolff
*Attorney, Agent, or Firm*—Flehr, Hohbach, Test, Albritton & Herbert

[57] ABSTRACT

A slider lifter for a disc drive is disclosed which utilizes a shape memory element to lift a slider away from the surface of a disc. The slider is supported adjacent the surface of the disc by a flexure which has a lifting wire attached thereto. The lift wire extends past the edge of the rotating disc through a hole in a leaf spring cantilevered adjacent the disc's edge and terminates in a crimped portion or stopper. The stopper is separated from the rear surface of the leaf spring by an unload space. A shape memory metal wire is attached to the leaf spring at a point spaced apart from the lift wire and extends back to a fixed support wall. Energization of the shape memory wire causes a phase change in the shape memory wire which restores the wire to its original length. The shortening of the shape memory wire pulls the leaf spring across the unload space so as to pick up the crimped portion of the lift wire. Further shortening then draws the lift wire such that it lifts the slider off of the surface of the disc. When power is removed, the shape memory allow element again changes phase, thereby releasing the leaf spring which allows the slider to rest on the surface of the disc.

5 Claims, 1 Drawing Sheet

DISC DRIVE SLIDER LIFTER USING SHAPE MEMORY METALS

FIELD OF THE INVENTION

This invention relates generally to an actuator for loading and unloading a slider in a magnetic disc apparatus, and more particularly to an actuator for loading/unloading a slider incorporating shape memory metals.

BACKGROUND OF THE INVENTION

A typical hard disc drive or so-called Winchester disc drive is a unit for storing data consisting of a disc drive housing, a hard information storage disc, and a read/write head or slider for retrieving data from the hard disc. The slider is typically cantilevered over the hard disc from a supporting structure by a flexure arm.

In the typical operation of such a disc drive, the slider rests on a landing zone on the surface of the disc while the power is off. In operation, the drive unit is powered up and the disc begins to rotate. After the disc reaches a certain speed, the slider rises slightly off the landing zone under the influence of an air bearing generated by the rotation of the disc. However, until the slider rises, there is considerable friction associated with head drag on the disc which causes wear to both the slider and disc. Just breaking the head free from the surface of the disc on which the slider has been resting can require a considerable force to overcome the force which holds the two smooth surfaces together (called "stiction"). Additionally, when the unit is powered down, the same friction will occur between the surface of the head and the surface of the disc until the disc stops rotating.

In order to overcome this friction, discs are coated with a protective layer and lubricants are applied. Additionally, the discs typically require a dedicated landing zone where the slider can slide to a halt and rest when the unit is powered off. No data can be stored in the landing zone. Consequently, the amount of the data that can be stored on a disc is reduced. Moreover, a large disc drive motor is required to overcome the adverse frictional and stiction effects, and a motor brake is often necessary to stop the rotation of the disc when the motor is turned off to reduce frictional wear and motor size requirements.

Thus, it can be appreciated that it would be desirable to raise the slider during power-up and keep it raised for a brief period even after power-down until the disc has essentially come to a halt to eliminate the adverse effects of friction.

In a number of prior-art patents including U.S. Pat. No. 4,684,913, it has been proposed to take advantage of a shape memory metal phenomenon in raising and lowering the slider or actuator. The phenomenon of shape memory is, of course, already well understood. It is based on the thermoelastic martensitic transformation which will be explained hereunder. A shape memory alloy, such as Ti—Ni alloy, has a high temperature austenitic phase wherein the crystal structure is body center cubic. When cooled below its transformation temperature, the austenitic structure undergoes a diffusionless shear transformation into a highly twinned martensite crystal structure. In the martensite phase, the alloy is easily deformed by the application of a small external force. When the alloy is heated through its transformation temperature, the martensitic phase is elastically returned to the former austenitic phase (inverse transformation) according to a given ordered crystal and orientation law. The alloy has the property of offering an exceedingly large recovery force when returning to this austenitic phase. Therefore, the employment of a resilient force as a bias force for deformation of the martensitic phase alloy at a low temperature permits the alloy to be used as a reversible actuator with temperature cycling. Further, since the recovery force which is generated with the return to the austenitic phase is quite large, it is possible to take advantage of the recovery force to do work.

It is important to the design of slider lifters to provide a device which raises and lowers the slider without requiring modification of the design of the flexure arm. Avoiding modification of the existing design of the flexure arm is a primary aspect of a successful device for loading and unloading the head. The lack of commercial success of prior-art designs is due in significant part to their failures in this area. The reason is that in a conventional floating head slider, the head is expected to float in a stable fashion about 0.2 micrometers over the surface of the disc which is rotating at constant speed. Therefore, the combined flexure arm and slider are very sensitive as to their loading and air foil characteristics. A great deal of time and effort have gone into the flexure and slider designs. Any design that requires modification of the flexure arm is looked upon with great disfavor.

Two prior art patents representative of the use of shape memory alloy technology in load/unload suspension devices for magnetic disc apparatus are U.S. Pat. No. 4,605,979, Inoue, and U.S. Pat. No. 4,684,913, Yaeger. Both of these, as can be immediately seen from an inspection of the figures, incorporate the use of shape memory alloys to attempt to provide a more efficient system for loading and unloading a transducer head from a disc surface. However, they each utilize a relatively high profile device which requires a significant spacing between adjacent discs. In present disc drive technology, such spacing is simply no longer available. To maximize the capacity of disc drives being manufactured, discs are spaced as closely as the supporting flexure will allow.

Therefore, the problem presented in the design of the present invention is to incorporate the strong recovery force affording by shape memory metals in a head unloading design without requiring significant modification of the existing design characteristics of the flexure arm. Another requirement is to incorporate a flexure utilizing shape memory alloys to load and unload the head while maintaining an extremely low flexure profile to minimize spacing between the vertically-spaced discs.

SUMMARY OF THE INVENTION

In summary, the present invention includes a device for controllably loading and unloading a slider from the surface of a disc. The slider is supported adjacent the surface of the disc by a flexure which has a lifting wire attached thereto. The lift wire extends out past the edge of the rotating disc and extends through a hole in a leaf spring cantilevered adjacent the disc edge and terminates in a crimp portion or stopper. The stopper is separated by an unload space from the rear surface of the leaf spring. A shape memory metal wire is attached to the leaf spring at a point spaced from the lift wire and extends back to a fixed support wall. Energization of the shape memory alloy element wire causes a change of phase of the shape memory wire and movement of the leaf spring a sufficient distance to carry the leaf spring across the unload space, pick up the crimped portion of the lift wire, and draw the lift wire to lift the slider off the surface of the disc. When power is removed, the shape memory alloy element again changes phase, releases the leaf spring and rests the slider on the surface of the disc.

The features and advantages of the present invention will become more apparent from the detailed description given below in conjunction with the accompanying figures.

DETAILED DESCRIPTION OF A PREFERRED EMBODIMENT

According to the present invention, there is disclosed herein a slider lifter structure including a support structure, a flexure arm, a flexible biased arm cantilevered from the support structure, and a shape memory element operatively connected between the support structure and the cantilevered, elastic beam element. The shape memory alloy element in one of the martensitic and austenitic conditions cooperates with the elastic beam to cause the lift wire to lift the slider off the surface of the disc. The shape memory element in the other of the martensitic and austenitic conditions cooperates with the resilient beam to allow the lift wire to lower the slider onto the disc.

In the preferred form to be described below, it is when the shape memory element is in the austenitic condition or austenitic phase that the lift wire is caused to withdraw the slider from the surface of the disc. In this way, whenever power is applied to the disc drive, that same power may be used to heat the shape memory alloy element, changing the shape memory alloy from its martensitic phase to the austenitic phase. The memory alloy will then cooperate with the cantilevered leaf spring to grasp a lift wire and cause the lift wire to move the flexure and slider off the surface of the disc.

Figure 1:
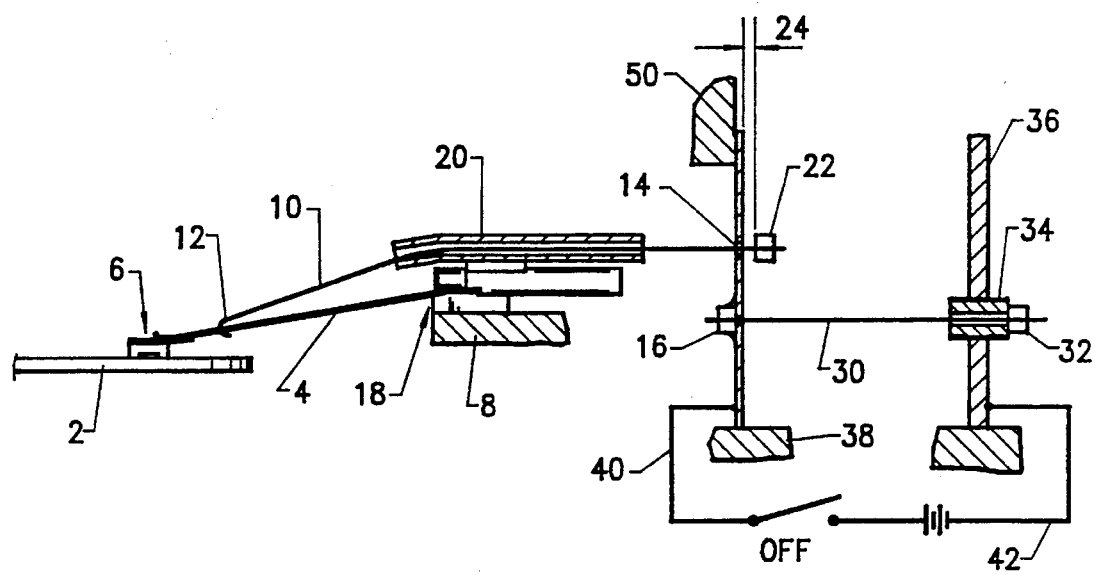
FIG. 1 is a side elevational view of the low profile slider lifter of the present invention in the power-off mode.

Referring to the drawings and more particularly to FIG. 1, there is shown the slider lifter of the present invention. For clarity, only a portion of the disc 2 is shown. The flexure 4 which supports the slider 6 is supported on a carriage generally indicated at 8 of a type which is well known in this technology for positioning the slider over the disc. All of the elements shown in the figure as supported on a fixed surface would typically be supported on the carriage 8 so that they maintain their physical relationship with movement of the carriage to position the transducer selectively over the disc.

The flexure 4 is the standard flexure arm which is typically used in the manufacture of Winchester disc drives. The lift wire 10 is shown terminating in a hook 12 and being led back through an opening 14 in a leaf spring 16. The wire 10 is hooked to the flexure arm as it has been determined that this form of attachment has the least effect on the overall performance of the flexure arm and also provides for ease of assembly. As the wire will be moving back and forth over the edge 18 of the support block 8, it is encased in and slides through a teflon guide tubing 20. The lift wire 10 ends in a crimp or stop 22 which is located at a distance indicated by arrow 24 which comprises an unload space 24. This unload space 24 is necessary to decouple the leaf spring 16 from the crimp or stop 22 so that fluctuations in the temperature of the drive cannot accidentally or unintentionally unload the slider from the surface of the disc or alternatively cause the slider to be accidentally dropped on the surface of the disc which will be constantly rotating. Such accidental contact of the slider with the disc surface must be avoided because damage to the data storage regions of the disc surface would almost certainly result.

The shape memory element in this embodiment comprises a wire 30 attached to the leaf spring 16 at a point separated from the hole 14 through which the lift wire passes. The other end of the shape memory alloy wire terminates at a crimp or stop 32 behind an adjustment screw 34. The adjusting screw 34 is fixed in a supporting frame piece 36 which is electrically isolated from the support 38 for the leaf spring 16. Two power leads 40, 42 are shown for supplying power to the shape memory alloy to heat the wire element 30. The power source is typically one which supplies power whenever the drive is in operation, such as the spindle motor power supply.

Figure 2:
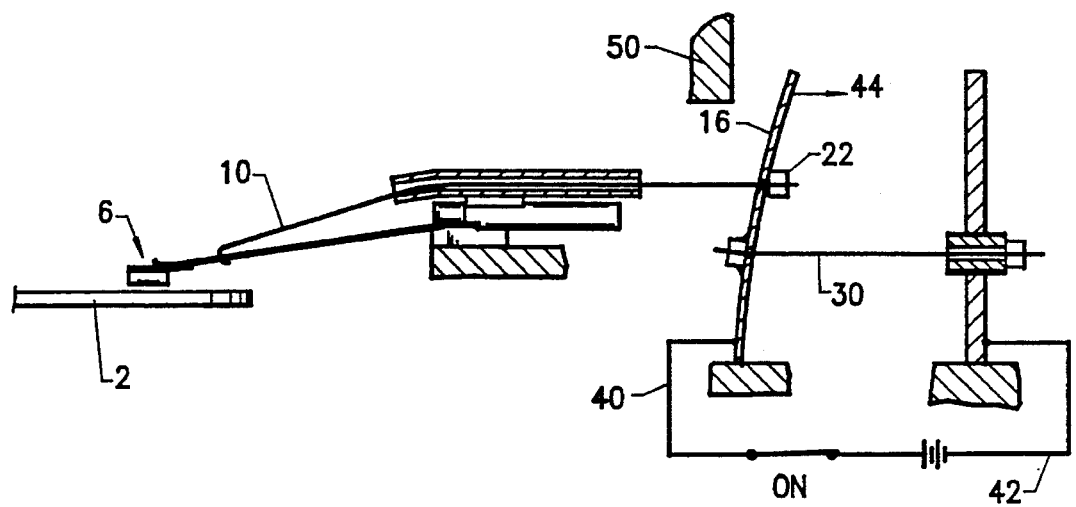
FIG. 2 is a elevational view in section of the slider lifter of the present invention in the power-on mode.

The operation of the shape memory alloy element 30 in lifting the slider 6 off the surface of the disc 2 when power is applied becomes evident from an inspection of FIG. 2. As shown in this figure, when power is applied through the wires 40, 42, the shape memory alloy wire 30 is actuated with heating of the wire and returns to its preset austenitic phase which in this embodiment would be shorter than its martensitic phase. For example, in the described embodiment a shape memory alloy wire having a length of 0.5 inch, will change in length about 4% or about 20 mils. This will be sufficient to produce the effect shown in FIG. 2 whereby as the wire 30 changes phase, the leaf spring 16 is pulled in the direction of the arrow 44 closing the unload space 24 shown in FIG. 1. The leaf spring then picks up the stop 22 at the end of the lift wire 10 and pulls on the wire, lifting the slider 6 off the surface of the disc 2. A head lift of about 0.001 to 0.010 inch can be achieved using this structure. Moreover, with a lift wire 10 having a length of 1.5 to 4.0 inches, the change in temperature over a range of 0° to 100° C. will be no more than about 0.003 inch, leaving a sufficient clearance such that the gap 24 is not closed by normal expansion and contraction of the wire 10, thereby avoiding inadvertent loading or unloading of the slider 6 on the disc surface. When power is removed from the wires 40, 42, the leaf spring 16 returns to its initial position resting if desired against a block or stop 50. The use of the spring force in the spring 16 is necessary to return the shape memory alloy to its original length as the alloy returns to its martensitic phase with cooling. The slider is thereby gradually and slowly returned to rest on the surface of the disc after power has been removed.

Typically the power may be supplied from a source such as the power that is used to drive the spindle motor which causes rotation of the disc, whereby whenever power is applied to the spindle motor and the discs are to rotate, then the shape memory alloy wire 30 changes to its austenitic phase and lifts the slider off the surface of the disc. When the spindle motor is turned off as the discs slow and stop, the shape memory alloy cools, is stretched by the spring force of spring 16 and rests the slider 6 on the disc surface.

Modifications of the first described embodiment may be apparent to a person of skill in the art who studies the present invention disclosure. For example, FIGS. 1 and 2 show only one slider lifter per disc, it is of course understood that there will normally be two slider lifters per disc, one above the disc and one below it. For clarity, the slider lifter below the disc is not shown.

Most modern Winchester disc drives utilize a plurality of discs mounted on a single spindle, with a slider lifter associated with the slider or sliders accessing the data on each disc surface.

Among the many advantages of the present invention are that a smaller spindle motor may be used because the power from the motor is not used to overcome static and start-up friction associated with slider drag on the disc. Further, the need to stop the motor quickly is removed if there is no slider disc friction. Thus it is possible to eliminate a motor brake, and limit the disc lubricant which is necessary since the slider only touches the disc when the disc is not rotating. Further, fewer contaminants are introduced into the sealed atmosphere of the head disc assembly, since slider disc friction is essentially eliminated. The storage capacity of the disc is increased substantially by eliminating the landing zone or limiting the size of the landing zone which is normally provided on the surface of the disc.

Finally, this has all been accomplished without significant alteration of the characteristics of the flexure arm, an essential objective of this invention, since disc drive manufacturers are loath to change aspects of the flexure arm.

What is claimed is:

1. In a slider lifter structure including a flexure arm for use with a data storage device having a frame, at least one rigid rotating disc, a spindle motor for constantly rotating said disc, a power supply for energization of said spindle motor and drive means for moving said flexure arm parallel to a data storage region on a major surface of said disc, said slider lifter structure further including at least one slider supported on the end of said flexure arm for reading and writing data in said data storage region on said major surface of said disc, and a flexure arm support carriage for supporting, moving and positioning said flexure arm and said slider relative to said surface so that said slider may selectively access said data storage region, the improvement in said slider lifter structure comprising:

a resilient leaf spring supported on said frame adjacent said flexure arm, said resilient leaf spring being movable between a first undeformed status and a second deformed status;

a wire running from said resilient leaf spring to said flexure arm supporting said slider;

a shape memory alloy element operatively connected between a fixed region of said frame and said resilient leaf spring, said shape memory alloy element having a martensitic condition and an austenitic condition;

said shape memory alloy element in one of said martensitic and austenitic conditions elastically deforming said resilient leaf spring element from said first undeformed status to said second deformed status to raise said flexure arm and move said slider from a first position resting on said major surface of said disc to a second position displaced a first distance substantially perpendicular to said mayor surface of said disc;

said shape memory alloy element in the other of said martensitic and austenitic conditions permitting said resilient leaf spring to elastically return to said first undeformed status from said second deformed status to lower said flexure arm and move said slider to said first position from said second position; and bias means for heating said shape memory alloy element to cause said change in state from said martensitic condition to said austenitic condition.

2. The slider lifter structure of claim 1 wherein said bias means is activated by turning on said spindle motor whereby said shape memory alloy element changes from said martensitic condition to said austenitic condition in response to energization of said spindle motor.

3. The slider lifter structure of claim 2 wherein said shape memory alloy element and said resilient leaf spring cooperate so that when the shape memory alloy element is in the other of the martensitic and austenitic conditions, said resilient leaf spring returns said shape memory alloy element to its martensitic condition, so that with application of power by said bias means to said shape memory alloy element said element may again deform said flexure arm to move said slider from said first position to said second position.

4. The slider lifter structure of claim 3 wherein said wire extends from a point on said flexure arm near said slider through a hole in said resilient leaf spring and ends in a stop spaced a second distance from said resilient leaf spring when power is not applied by said bias means, whereby said slider is in said first position when said shape memory alloy element is in said martensitic condition.

5. The slider lifter structure of claim 4 wherein the length of said second distance is chosen relative to the length of said wire extending from said point on said flexure arm near said slider to said stop so that said slider cannot be unintentionally loaded onto or unloaded off said major surface of said disc due to changes in the length of said wire with changes in ambient temperature in said data storage device.

* * * * *